Feb. 15, 1938.  F. R. BICHOWSKY  2,108,248
CONDITIONING AIR OR GAS
Original Filed Nov. 7, 1934
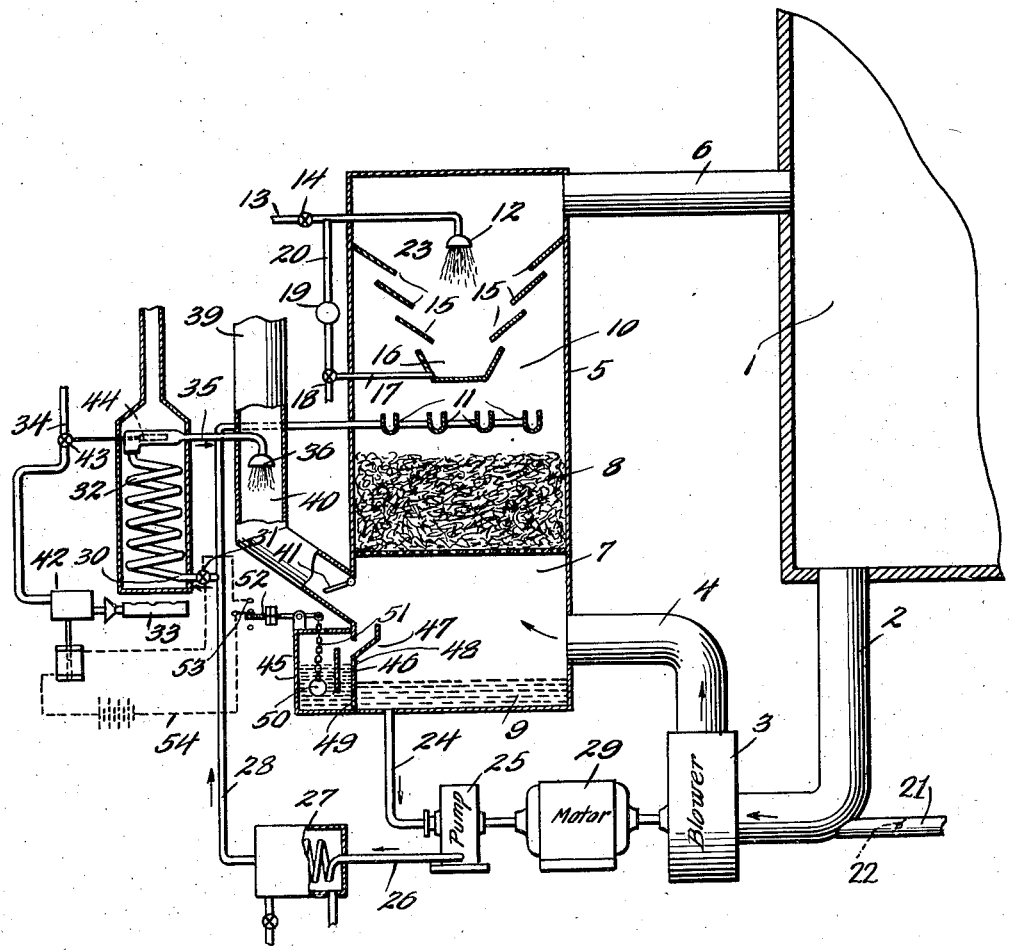
Inventor
Francis R. Bichowsky,
By Earle D. Crammond.
Attorney Patented Feb. 15, 1938

2,108,248

UNITED STATES PATENT OFFICE 2,108,248

CONDITIONING AIR OR GAS

Francis R. Bichowsky, Ann Arbor, Mich.

Application November 7, 1934, Serial No. 751,959
Renewed July 17, 1937

12 Claims. (Cl. 183—120)

The invention relates to conditioning gas and more particularly to a method and apparatus wherein gas is contacted with a liquid drying agent which is regenerated and recirculated in the system.

It is an object of this invention to provide a method and simplified apparatus for conditioning gas by means of a water vapor absorbing liquid medium which may be used over and over, and which may be circulated in a closed circuit with a portion thereof by-passed from the main portion of the circuit and returned thereto following concentration by heating and contacting of the medium in a stream of air to cool the medium. Another object is to construct an apparatus using a smaller number of pumps, motors, or blowers than is used in existing apparatus.

A further object of this invention is to provide a method and apparatus for conditioning air in which an air drying media is reconditioned by being contacted with a stream of air. Yet further other objects are to provide a way to control the efficiency of regeneration of the liquid drying agent by always supplying air under substantially uniform characteristics, to arrange a system always having a fixed amount of fresh air added, to have a fixed amount of fresh air added irrespective of infiltration, and to have easy reactivation of the liquid, etc.

Another object of the invention is to provide a system and apparatus for forcibly circulating air from and to an enclosure through a conditioning apparatus while bleeding a portion of air in its passage to be used in reconditioning the drying media and supplying an amount of fresh air to the apparatus equal to the amount bled therefrom.

Briefly stated, the invention includes apparatus and a method wherein air or other permanent gases are conditioned by contacting them with a liquid drying agent which may be recirculated in a closed system and which may be concentrated by heating, and also conditioned by air bled from the stream of conditioned air, together with suitable means for controlling the operation of the apparatus.

Further objects and advantages of the invention will be apparent from the following description of the method and apparatus, reference being had to the accompanying drawing forming a part of this specification and wherein a preferred form of the present invention is shown.

The figure shows, diagrammatically, an apparatus embodying the invention.

In the drawing, the apparatus is shown connected with an enclosure 1 to be supplied with conditioned air or gas. The conduit 2 for conveying air or gas from the enclosure connects with a blower 3 or other suitable device for supplying the air or gas under slight pressure through the conduit 4 to an enclosed conditioning chamber or tower 5, provided with an outlet in its upper portion connected with the enclosure to be conditioned by the conduit 6, which conveys the conditioned air or gas from the tower or conditioning chamber into the enclosure. The air or gas from the pump, at a pressure slightly above atmospheric, enters a contacting space 7, where the air contacts with a hygroscopic liquid either in the form of a spray or in the form of a film left on the surfaces of fibrous or other packing material 8, which may be supplied from above with the hygroscopic liquid. The tower is provided at its lower end with a sump 9 to collect the liquid drying agents which flow downwardly through the contacting space countercurrent to the air moving through the space. Above the zone comprising the packing material, the tower is provided with the space 10 and a spreader 11 in the form of pipes or troughs for the hygroscopic liquid which is uniformly distributed in its downward course through the packing. In the uppermost part of the conditioning chamber or tower, a spray nozzle 12 is shown centrally disposed in the chamber connected with a source 13 of water which may be controlled by valve 14. Overlapping baffles 15 are shown spaced to allow air passage therebetween and these converge to direct the water, which is not evaporated, inwardly and downwardly to a receiver 16 from which it may be drained away through pipes 17 and 18, or it may be recirculated by pump 19 through pipes 17 and 20, to the nozzles for reuse. The air having been dried by contact with the hygroscopic liquid in the contacting zone may be conveyed in its dried condition to the place where it is used, or it may, if desired, be further conditioned by evaporation of water from the nozzles in the space 23 before passing into the enclosure 1 where it is used, and from which it is returned for reconditioning in the apparatus. It will be readily appreciated that this vertical tower construction provides an arrangement which materially reduces the likelihood of excess liquid staying in the air stream because the air is moving against the forces of gravity which are acting on the liquid particles. This also provides an apparatus which requires very little floor space.

Apparatus of the character described is adapted for removing water vapor from the air or by means of the water spray nozzles in adding water to the air in accordance with the relative humidity of the air and the concentration and nature of the drying fluid. The description herein is, however, mainly confined to the method and apparatus for drying of air. In the operation of the apparatus for drying air, the liquid drying agents are distributed in a uniform manner by the spreader 11 and pass downward through the space 10, over the packing countercurrent to the air from which it will pick up moisture and become less concentrated and less thin as it passes through the space 7 into the collecting sump at the bottom of the tower. By maintaining a sufficient quantity of the liquid drying agent in the collecting sump, the collection of water vapor will not impair the drying power of the liquid until a considerable amount of moisture is taken up. Until this excess moisture condition is reached, the liquid in the sump may be used over and over again. This reuse is accomplished by a circulating system consisting of the pipe 24 connecting the collecting sump 9 through a circulating pump 25 and the pipe 26 connecting through an intercooler 27 with pipe 28, supplying the fluid to the spreader for redistribution in the tower and collection in the sump. The pump may be conveniently connected with motor 29 forming also a driving means for the blower.

In the course of time, if the drying liquid continues to take up moisture from the air sufficient water will collect in the sump 9 to decrease the drying power of the liquid. Under these conditions, means are employed to remove a portion of the drying liquid and concentrate it, thereafter returning the concentrated liquid to the sump. This allows a small portion of the liquid to be regenerated and highly concentrated so that a relatively small amount of heat is necessary to keep the liquid concentrated as only part is being treated. This arrangement also allows a reduction in the number of pumps needed as one alone can supply the bypass arrangement with liquid. The operation of the means is so adjusted as to maintain the concentration of the liquid in sump 9 between predetermined limits. To this end, there is provided a secondary circuit for the circulating drying agent consisting of pipe 30 leading from the main circulating pipe at such a point that there is a positive pressure on the liquid in the main circulating stream. The flow regulating device 31 allows flow of liquid through the heating means 32 illustrated in the drawing as comprising a coil of pipe in which the liquid is heated by burner 33, connected with the fluid fuel supply 34, or by means of any other source of heat.

The heated liquid from the concentrator passes through the pipe 35 for delivery through the nozzle or other diffusing device 36, located in a duct 39 providing contacting space 40 extending upwardly from the air conditioning chamber or tower 5 into which it opens to supply air through the duct under control of the damper 41. In view of the construction described several advantages are obtained. More efficient control of the regeneration is obtained because the air supplied for the regeneration has always substantially constant characteristics of temperature and humidity. This arrangement only requires one fan or blower to provide means for effecting motion of the stream of air to be conditioned and the stream of air used for regeneration. A further advantage lies in the introduction of a fixed amount of fresh air into the system. Furthermore, this is independent of the infiltration so that the total fresh air added is always constant and in proportion to that vented. Incidentally this also allows less duct work as a separate air stream is not needed to recondition the drying agent.

The concentrated liquid flowing downwardly through the contacting space in the duct is returned to the main body of liquid in the sump 9. To insure this return, the lower connection of the duct with the air conditioning chamber is so formed that the liquid collecting at this point will automatically drain into the sump containing the main body of the liquid. An advantage of this construction lies in the ease of regeneration and handling of the regeneration drying liquid. The flow of liquid from the main pipe 28 through pipe 30 and heater 32, to the spray nozzle 36 may be controlled by any suitable manual or automatic means. Likewise, the damper 41 controlling air passing through the duct may be subjected to automatic control and may be so connected with the control of the flow of liquid through the heater that the damper will be automatically operated when liquid is flowing through the heater in the concentration phase. The operation of the burner 33 is automatically controlled by the control device 42 interposed between the burner and the supply pipe 34. This automatic control is actuated in accordance with the condition of the drying liquid. A further control of the fluid fuel supplied through the pipe 34 is obtained by valve means 43 actuated by a thermostat 44 disposed in the fluid pipe at the top of the heating means so that the control of the fuel supply will respond to a predetermined temperature at the point where the thermostat is disposed.

The air in the contacting space 7 being forced by the blower 3 is at a pressure slightly above atmospheric and when the damper 41 is opened a controlled stream of this air is allowed to be bled or discharged through the duct 39. The hot liquid leaving the nozzle or diffuser 36 is contacted in the space 40 with the air flowing through the duct countercurrent to the flow of the liquid. Means are provided for collecting the concentrated liquid below the bottom of the air duct. This liquid passes down through space 40 to the lower portion of the duct where it is eventually drained into the main body of liquid. The descending liquid enters a container 45 through a chute 46 having a laterally extending baffle 47. The container thus forms a collecting chamber for the cooled concentrated liquid descending through the duct. Overflow holes 48 are provided in the side of the container to return excess liquid continuously to the main body of liquid in the sump of the conditioning tower. There is also provided a small opening 49 connecting the main supply of liquid with the chamber and so arranged that in the event the supply of liquid entering the chamber 45 falls below a certain fixed amount or fails completely, the liquid level in the container 45 will fall sufficiently to partly expose a sinker or plummet 50 in the main portion of the container. The position of the sinker plummet will depend upon the density of the liquid in which it is suspended. This plummet is connected by a supporting chain 51 connected with an adjustable switch lever arm 52 and the pull exerted by the plummet on the supporting chain will be increased as the density of the liquid is decreased. This change of force is employed to operate the switch lever arm in closing a contact 53 controlling an electric circuit indicated in dotted lines at 54, such circuit including the automatic control device 42 for controlling heat applied by the burner. This control circuit may also, if desired, be made to include the control device 31 supplying liquid to the secondary circuit and the damper 41. This type of control is shown and described for purposes of illustration, but the invention is not limited to the particular control devices shown, for many well known control means are capable of being substituted for that particularly selected for purposes of illustration. It is further contemplated within the scope of this invention to use such controls for the flow of fluid to the burner and for controlling the flow of liquid in the secondary circuit that this flow may be modulated or controlled without entirely shutting off the burner supplying heat or the supply of liquid through the heating means. In other words, the arrangement may be either periodic or continuous.

From the foregoing description, it will be appreciated that conditioned air at a slight pressure is made to perform the function of conditioning and cooling the cooling liquid being regenerated, and that the amount of air by-passed from the main conditioning chamber 7 will be supplied by fresh air in like amounts admitted by the duct 21 under control of the damper 22. The regeneration of the liquid is under control subject to the condition of the liquid and maintains the concentration of the cooling liquid in the main supply between predetermined limits. It will also be seen that the recirculation of the cooling liquid in the main tower can be carried on independent of the regenerating phase when the liquid in the main supply is in a condition between such predetermined limits. The system provides means for continuously conditioning a space, controlling at the same time the amount of fresh air supplied thereto and discharged therefrom with the important arrangement of utilizing the discharged air in conditioning the cooling liquid.

While the invention is hereinabove described in connection with the preferred embodiment, it is to be understood that the words which have been used are words of description rather than of limitation, and that changes within the purview of the appended claims may be made without departing from the true scope and spirit of the invention in all its aspects.

I claim:

1. The process of conditioning air in an enclosure which comprises withdrawing an air stream from the enclosure, dividing the air stream into two portions and passing said portions through separate contact zones, contacting said air streams with two different streams of hygroscopic liquid from a main body of such liquid and returning the streams of hygroscopic liquid to the main body, and venting one air stream outside the enclosure and returning the other air stream to the enclosure whereby to condition the air in the enclosure and simultaneously maintain predetermined hygroscopic conditions in the main body of the liquid.

2. The process of conditioning the air in an enclosure which comprises withdrawing air from the enclosure, introducing fresh outside air into the withdrawn air to form a mixed air stream, passing a portion of the mixed air stream in contact with a liquid hygroscopic agent and introducing the said mixed portion into the enclosure, venting another portion of the mixed air stream, heating a portion of the liquid hygroscopic agent, and contacting said heated agent with the vented air stream.

3. The process of conditioning air in an enclosure which comprises withdrawing an air stream from the enclosure, mixing outside air with said stream, dividing the mixed air stream into two portions, passing said portions of the mixed air stream through separate contact zones, contacting said mixed air streams with two different streams of hygroscopic liquid from a main body of such liquid and returning the streams of hygroscopic liquid to the main body, and venting one of the air streams outside of the enclosure and returning the other air stream to the enclosure whereby to condition the air in the enclosure and simultaneously maintain predetermined hygroscopic conditions in the main body of the liquid.

4. The combination with an enclosure to be air conditioned, of air conditioning apparatus in which air is dried, said apparatus comprising means for storing and collecting hygroscopic liquid used in the apparatus, means for recirculating a stream of the liquid from the collecting means through a drying zone in the apparatus, means for heating a quantity of the recirculating stream of liquid, means for removing moisture from the heated liquid by contacting it with a stream of air from the enclosure, and means for discharging said stream of air outside the enclosure after contacting it with said heated liquid.

5. An air conditioning apparatus comprising a chamber having a drying compartment, means for collecting liquids at the bottom of said compartment, means for dispersing liquid in contact with air in the drying compartment, means for recirculating said liquid, means for introducing a stream of air into said chamber, means for removing water from a portion of the recirculated liquid including a heater for the liquid and a contacting compartment in which the liquid is contacted with air, and means for supplying a stream of air from said chamber to contact the liquid in said contacting compartment.

6. In combination with an air conditioning apparatus in which air is contacted with a liquid drying agent in a drying zone, a separate contacting chamber, means for forcing a stream of air into said contacting chamber and into the drying zone of the apparatus, a liquid heater, means for conveying liquid drying agent from the apparatus to said heater, means for diffusing the liquid from the heater in the separate contacting chamber, and means responsive to the concentration of the liquid drying agent in said apparatus for controlling the amount of liquid drying agent passing into said heater.

7. In combination with an air conditioning apparatus in which air is contacted with a liquid drying agent in a drying zone, a separate contacting chamber, means for forcing a stream of air into said contacting chamber and into the drying zone of the apparatus, a liquid heater, means for conveying liquid drying agent from the apparatus to said heater, means for diffusing the liquid from the heater in the separate contacting chamber, and means responsive to the concentration of the liquid drying agent in said apparatus for controlling the operation of the heater.

8. In combination with an air conditioning apparatus in which air is contacted with a liquid drying agent in a drying zone, a separate contacting chamber, means for forcing a stream of air into said contacting chamber and into the drying zone of the apparatus, a liquid heater, means for conveying liquid drying agent from the apparatus to said heater, means for diffusing the liquid from the heater in the separate contacting chamber, a container for receiving the drying agent from the contacting chamber, a plummet normally submerged in the drying agent in the container, and means responsive to an apparent change in weight of said plummet for controlling the operation of said heater.

9. In combination with an air conditioning apparatus in which air is contacted with a liquid drying agent in a drying zone, a separate contacting chamber, means for forcing a stream of air into said contacting chamber and into the drying zone of the apparatus, a liquid heater, means for conveying liquid drying agent from the apparatus to said heater, means for diffusing the liquid from the heater in the separate contacting chamber, means for collecting the concentrated drying liquid from the separate contacting chamber and returning it to the main supply in the apparatus, an electric circuit including means controlling the heater and the supply of liquid thereto, and means responsive to changes in the degree of concentration of the liquid for controlling the circuit.

10. In combination with an air conditioning apparatus in which air is contacted with a liquid drying agent in a drying zone and a separate contacting chamber, means for forcing a stream of air into said contacting chamber and into the drying zone of the apparatus, a liquid heater, means for conveying liquid drying agent from the apparatus to said heater, means for diffusing the liquid from the heater in the separate contacting chamber, and means for controlling the supply of air passing through said contacting chamber.

11. In combination with a space to be conditioned, means for introducing fresh air into said space, means for circulating a stream of air from said space to and from an air conditioning means, said air conditioning means including a circulated drying liquid, means for removing moisture from said liquid and means for discharging said moisture into a stream of air from said space to be conditioned.

12. Air conditioning apparatus including drying and humidifying chambers for conditioning air within an enclosure, means for circulating a stream of air from the enclosure through the drying and humidifying chambers and back to the enclosure, a body of porous material in the drying chamber, means for spreading a stream of liquid drying agent over the porous material, and means for conducting a stream of air from the aforesaid stream of air in contact with a stream of liquid drying agent to extract moisture from the liquid and venting the said air stream outside the enclosure.

FRANCIS R. BICHOWSKY.